June 9, 1925.  
E. P. BANCROFT ET AL  
1,541,316  
AUTOMATIC TELEGRAPH SYSTEM  
Filed July 1, 1920 7 Sheets-Sheet 1

Inventors.  
Erwin P. Bancroft.  
Mark B. Kerr.  
By Joel C. R. Palmer Atty.

Patented June 9, 1925.

1,541,316

UNITED STATES PATENT OFFICE.

ERWIN P. BANCROFT, OF BROOKLYN, AND MARK B. KERR, OF NEW YORK, N. Y., ASSIGNORS TO WESTERN ELECTRIC COMPANY, INCORPORATED, OF NEW YORK, N. Y., A CORPORATION OF NEW YORK.

AUTOMATIC TELEGRAPH SYSTEM.

Application filed July 1, 1920. Serial No. 393,393.

*To all whom it may concern:*

Be it known that we, ERWIN P. BANCROFT and MARK B. KERR, citizens of the United States, residing at Brooklyn, in the county of Kings and State of New York, and at New York city, in the county of New York and State of New York, respectively, have invented certain new and useful Improvements in Automatic Telegraph Systems, of which the following is a full, clear, concise, and exact description.

This invention relates to automatic telegraph systems.

An object of the invention is to provide a telegraph system which is flexible, one whereby an increased number of stations may be operatively included within the system, and one whereby any station connected therein may communicate directly and automatically with any other predetermined station.

Further objects of the invention are the provision of efficient and reliable means for synchronizing, phase-finding and correcting for line lag.

There are two principal or well-known telegraph systems in general use, one the multiplex system, and the other the start-stop system.

The multiplex printing telegraph system is particularly adapted for handling heavy telegraphic traffic where printed messages are desired, and is usually employed for communication over circuits of considerable length. With such a system, many messages may be transmitted over a line wire simultaneously. For example, a quadruple duplex system provides eight channels of communication, four in each direction; and a sextuple duplex system provides twelve channels of communication, six in each direction. Current impulse distributors of the rotary type are employed and special apparatus is required for maintaining the distributors in synchronism. In the past it has been extremely difficult to maintain more than two distributors in synchronism, but by means of recently developed electrical correcting systems it is possible to maintain a large number of multiplex distributors in synchronism with ordinary line conditions, and it is practicable to maintain in synchronism over very bad lines many more multiplex distributors than heretofore possible. The electrical method of correction, whereby this is possible, is covered by United States Patents 1,279,905 and 1,292,048, and applications relating to improvements thereon.

The start-stop system is one wherein the current impulse distributors make one complete cycle of operation, or start and stop once for each character transmitted, and the system derives its name from the action of the distributing apparatus. The system is essentially one for light telegraphic traffic where printed messages are desired and is commonly employed for communication over short lines and is sometimes termed a shortline system, although not limited for use over such lines as it is equally suitable for use over lines of great length. The system requires no synchronizing apparatus inasmuch as the distributors are automatically restored to normal after each character is transmitted.

This invention contemplates various adaptations and combinations of the multiplex and start-stop systems and improvements therein whereby an unlimited number of stations may be placed in direct communication with one another in an efficient, inexpensive and reliable manner. The association broadly of a multiplex and start-stop system into a unitary structure whereby message impulses are automatically transferred from one system to another and vice versa, is covered by Patent No. 1,407,042, issued Feb. 21, 1922. This invention has to do with improvements on the systems disclosed in the above-mentioned copending applications and upon multiplex and start-stop systems in general, whereby greater flexibility and reliability is attained in the transmission of many messages simultaneously over a limited number of circuits.

Referring to the drawings, Fig. 4 is an amplification of Fig. 1 and shows diagrammatically a Y-forking arrangement comprising three terminal multiplex distributing stations arranged for four channels of communication from each terminal multiplex station, through a repeating station, to each of the other terminal multiplex stations, and also illustrates how one arm of the multiplex distributor at, say for example, St. Louis, may be extended by means of start-stop equipment to a distant or outlying station, and how two arms of the multiplex distributor at Chicago for example, may be extended by means of start-stop equipment to two outlying cities or stations. It is understood, of course, that any or all of the arms of each terminal multiplex station may be extended, if desired, to an equal number of distant or outlying stations by means of start-stop equipment.

Figures 1, 2:
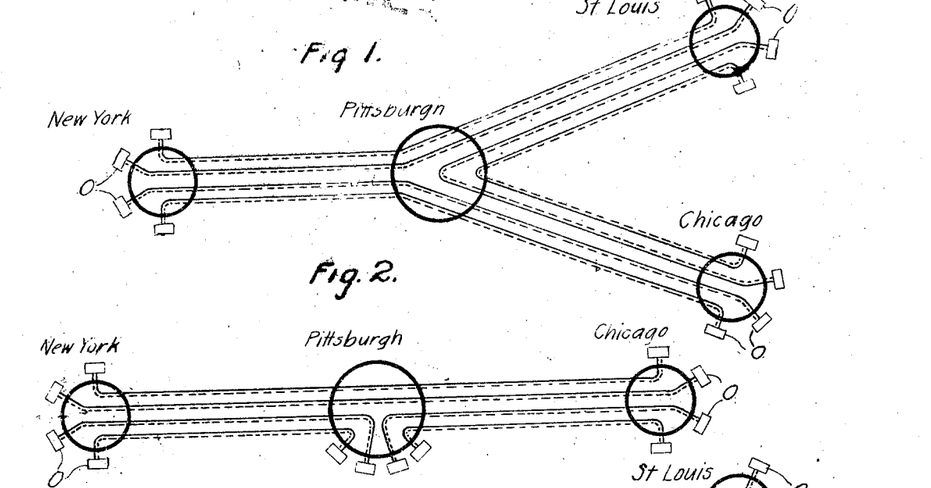
Fig. 1 represents a typical Y-forking arrangement with three terminal stations arranged for communication with one another through a common or single repeating station.
Fig. 2 represents two terminal stations arranged for communication with one another through a repeating station with certain channels of each terminal station terminating at the repeating station.
Figures 3, 10:
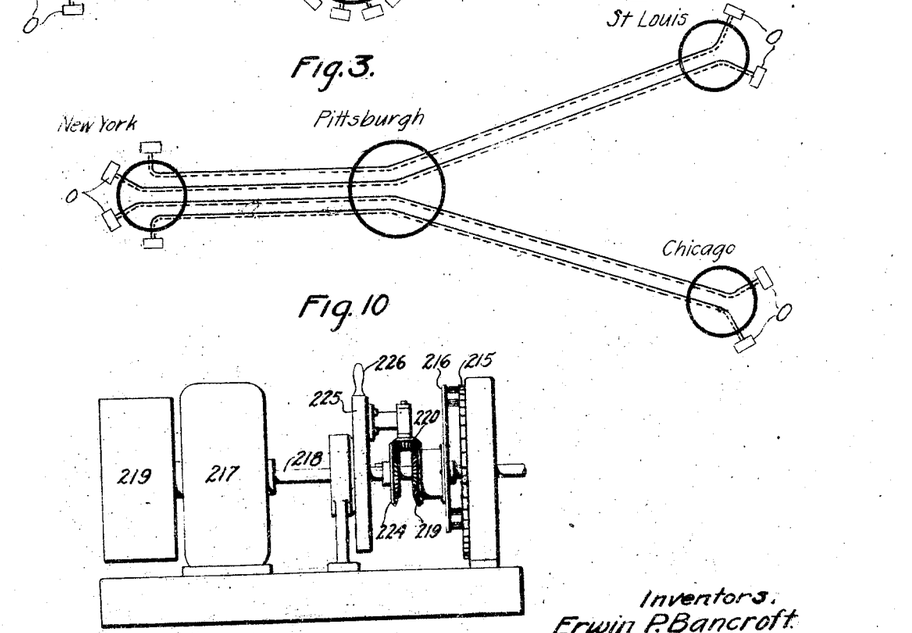
Fig. 3 represents another typical Y-forking arrangement with a quadruple duplex arrangement extending from one terminal station to a repeating station, and a double duplex system extending from the repeating station to each of two terminal stations.
Fig. 10 represents a mechanical structure for shifting or orientating the brush arms of the multiplex distributor.

Referring, for the moment, to Figs. 1, 2 and 3, the full lines indicate the number of channels of communication in one direction, and the broken or dotted lines, the number of channels of communication in the opposite direction. In each of these figures, the reference character O may be assumed to represent operating tables or preferably a transmitting and receiving instrument located on the operating tables as is customary in actual practice. For the sake of illustration, the multiplex terminal stations in Figs. 1 and 3 are represented as indicating stations at New York, St. Louis and Chicago, respectively, with the repeating station located at Pittsburgh. In Fig. 2 the multiplex terminal stations are indicated as representing stations at New York and Chicago, with the repeating station located at Pittsburgh. Fig. 1 represents a full quadruple duplex system with two arms of each multiplex terminal station repeating through to each of the other multiplex terminal stations. Fig. 2 represents a full quadruple duplex system extending from each terminal station to the repeating station with two arms of each terminal station repeating through to the other terminal station, and with two arms of each terminal station terminating at the repeating station. Fig. 3 represents a full quadruple duplex set extending from the New York terminal station to the repeating station, with two double duplex sets extending from the repeating station to each of the other multiplex terminal stations. With reference to the systems shown diagrammatically in Figs. 1, 2 and 3, it is to be understood that the repeating station and all terminal multiplex stations connected thereto, operate in synchronism.

In Fig. 4 there is shown diagrammatically a full quadruple duplex system similar to Fig. 1, with some of the multiplex arms extended by means of start-stop equipment to distant or outlying stations. At the New York terminal multiplex station there are illustrated four transmitters T and four receivers R, arranged to be connected through the multiplex sending and receiving distributors SD and RD respectively, to the line circuit LA extending to the repeating station at Pittsburgh. At the St. Louis terminal multiplex station there are illustrated three transmitting and three receiving instruments connected directly to the sending and receiving distributor faces with one quadrant of the receiving distributor connected to a start-stop sending distributor and one quadrant of the transmitting distributor likewise connected to a start-stop receiving distributor for communication over a line circuit to a distant or outlying station represented as Kansas City, which is provided also with transmitting and receiving distributors of the start-stop type. At the Chicago terminal multiplex station there are shown two channels terminating and two originating in local apparatus, with the remaining four channels extended by means of start-stop equipment to distant or outlying stations, illustrated in the drawing as representing stations at Gary and Milwaukee. At Pittsburgh, or the repeating station there are illustrated diagrammatically three receiving distributors RD and three sending distributors SD. The repeating equipment and necessary circuits therefor are more clearly illustrated in Fig. 5 wherein the line circuit LA, connecting New York with Pittsburgh, is shown coming in at the repeater station through line relay 10, line LB, connecting St. Louis with Pittsburgh, is shown coming in through the line relay 11 and line circuit LC extending to Chicago is shown coming into the repeating station, through line relay 12. The receiving and sending distributor faces are shown developed. The sending distributor faces SD, each comprise a continuous ring 13 and a segmented ring 14. In the arrangement illustrated each ring 14 consists of twenty segments, each of which is insulated from all of the other segments and adapted to be connected to its respective continuous ring 13 at regular recurring intervals, through a distributor brush 15. The receiving distributor RD likewise comprises a continuous ring 16 and a segmented ring 17 comprising an equal number of insulated receiving segments. The receiving segments are also arranged to be connected sequentially to the continuous ring 16, by means of a distributor brush 18. The receiving segments are illustrated as being of shorter length than the sending segments, which is customary in actual practice, in order that only the center or undistorted portion of each signaling impulse will be received and distributed to the storing relays 19 and 20. The storing relays 19 and 20 are each connected to alternate segments of the receiving distributor and each relay is adapted to receive and store alternate signals for retransmission.

Figure 5:
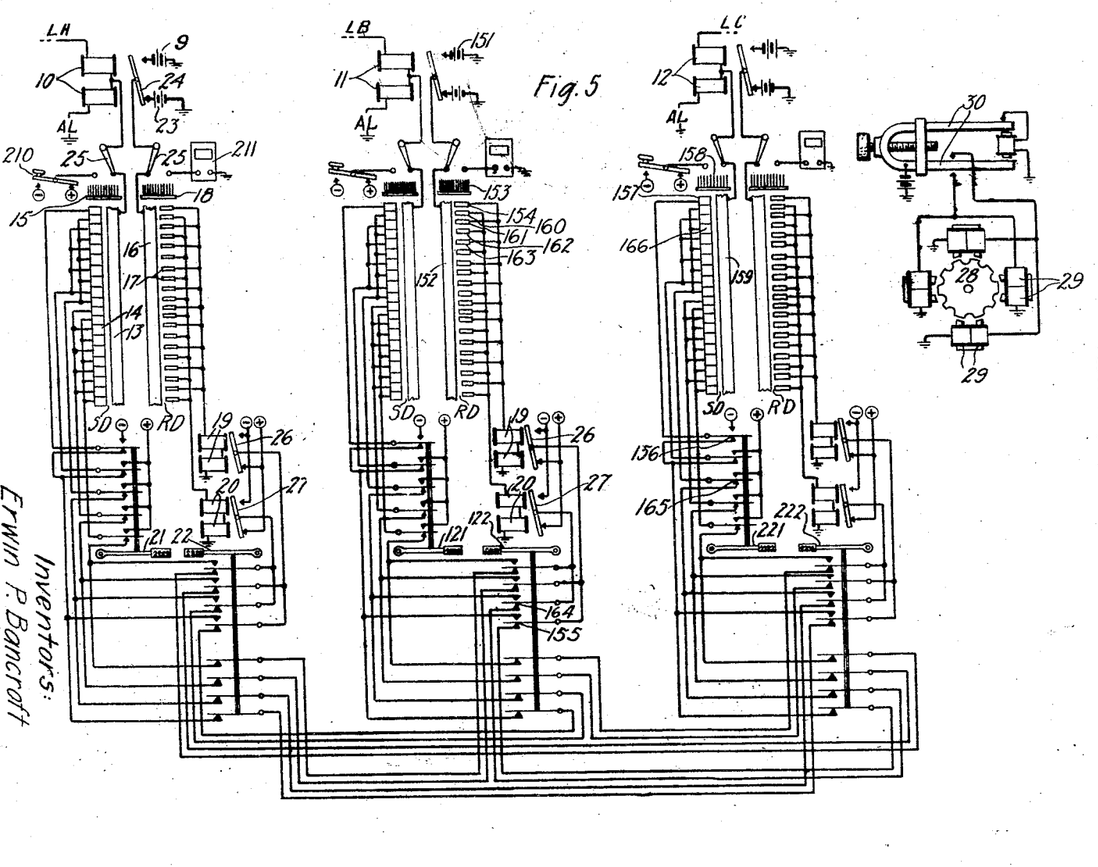
Fig. 5 illustrates diagrammatically the equipment and circuits required at the repeating station for handling eight channels of communication to and from each of three distant stations, as illustrated in Figs. 1 and 4.

Associated with each sending and receiving distributor repeater unit is a phasing key 21, 121 and 221 for operating a plurality of contacts, and a lag-finding key 22, 122 and 222 likewise adapted to control circuits through a plurality of contacts. The purpose of these keys will be described later. From reference to Fig. 5, it will be noted that the distributors, storing relays, switching means, etc. associated with each line circuit is a replica of that associated with each of the other line circuits, consequently a description of one unit will suffice for all. The phasing and lag-finding keys as illustrated in Fig. 5, are arranged for repeating signals received over each line circuit out over each of the other line circuits. For example, in the arrangement shown, selecting impulses received over the line circuit LA will cause the operation of line relay 10, and either positive battery 9 or negative battery 23 will be connected through armature 24 of relay 10, switch 25, receiving distributor ring 16, brush 18, segments 17, to storing relay 19 or 20 depending upon the character of the signaling impulse and the position of brush 18 upon receipt of each signaling impulse. The relays 19 and 20 upon being energized, will actuate their armature 26 and 27 to connect positive or negative battery through the lower contacts of lag-finding key 22, lower contacts of the phase-finding keys 121 and 221, associated with line circuits LB and LC, to the corresponding sending distributors and out over the line circuits LB and LC. In order that the traffic of signals from each terminal station may be properly repeated at the repeating station and distributed to the proper line circuits, it is necessary that the sending and receiving brushes at the terminal and repeating stations bear the proper phase relation with respect to one another, and that the distributors at all stations operate in synchronism. This will be explained more in detail hereinafter.

In connection with Figs. 5, 6, 7 and 8, there is shown a well-known phonic wheel motor 28 of the LaCour type, driven by stationary magnets 29, arranged in pairs and each pair of magnets is adapted to be energized alternately over circuits controlled by a driving fork 30.

Figure 6:
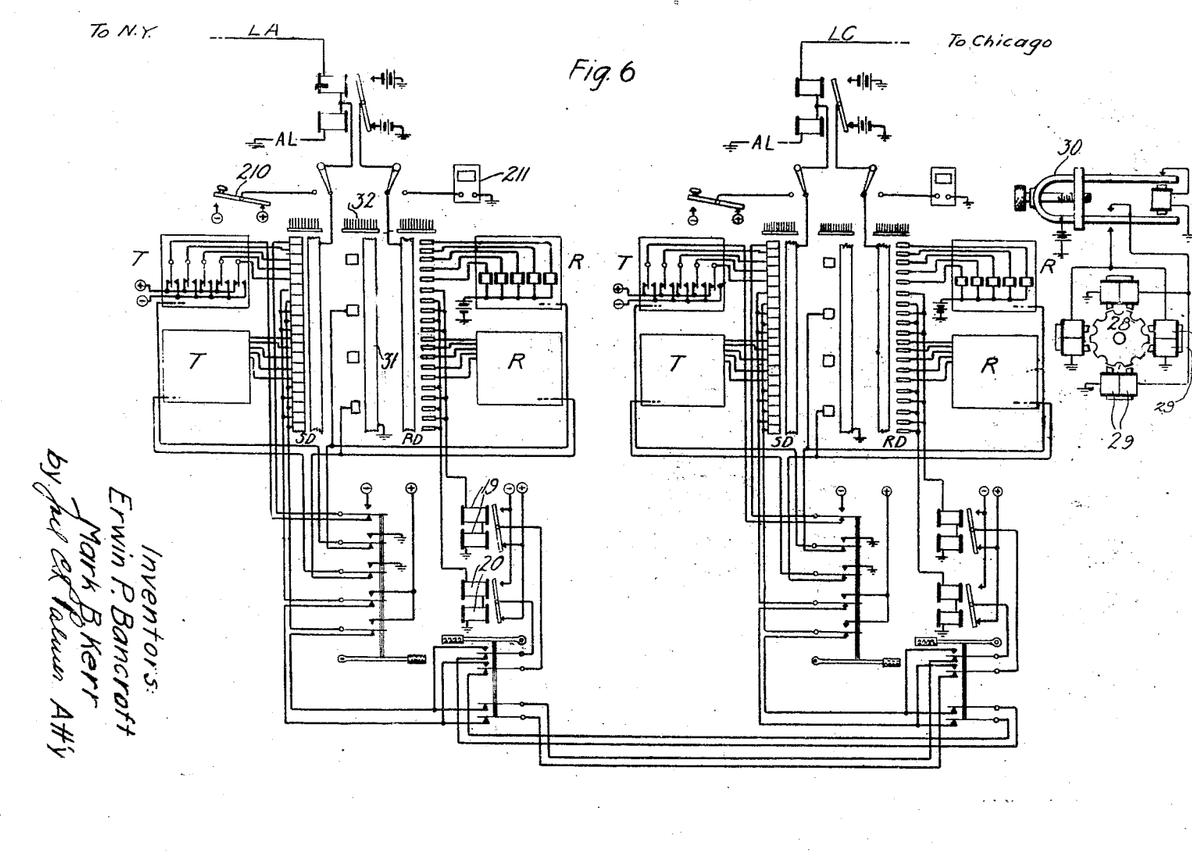
Fig. 6 illustrates diagrammatically the apparatus and circuits required at a repeating station with four channels repeating through and four channels of each of the terminal stations terminating at the repeating station, as illustrated, in Fig. 2.

In Fig. 6 there is shown the necessary apparatus and circuit arrangements required at the repeating station for repeating two channels from each terminal station through to the other terminal station, with two arms from each terminal station terminating at the repeating station, as disclosed diagrammatically in Fig. 2. In Fig. 6, like Fig. 5, there is shown a pair of sending distributor rings SD and a pair of receiving distributor rings RD associated with each line circuit. In addition to the regular sending and receiving rings, there is illustrated in connection with each distributor unit a pair of local rings, one of which is continuous, and the other segmented. The local continuous ring 31 is shown connected to ground and the local segments are adapted to be connected sequentially to the grounded ring by means of a distributor brush 32, for controlling operations in the local receiving and transmitting instruments. For example, the local distributor segments may be utilized to control the operation of printing magnets in the receiving printers and the operation of stepping or tape-feeding magnets of automatic tape transmitters. Referring to the sending distributors in Fig. 6, the first group of five transmitting segments is connected directly to contacts of a local transmitter T, and the third group of five sending segments is likewise connected to a local transmitter T, while the second and fourth groups of sending segments are arranged for the purpose of distributing impulses to the line circuit LA, which are received over the line circuit LC; likewise the first group of five receiving segments of the receiving distributor RD is connected to operating magnets of a receiving device, such as a printer. The third group of five receiving segments is likewise connected to a receiving device, while the second and fourth groups of receiving segments are connected to storing relays 19 and 20, whereby the impulses received on those particular groups of segments may be stored and retransmitted through the second and fourth groups of segments of the sending distributor SD associated with the line circuit LC, to the other terminal station. The receiving transmitting distributing and repeating unit associated with the line circuit LC is likewise adapted to transmit and receive locally from certain quadrants of the distributors, and to repeat through to the other line section LA impulses received on other predetermined quadrants.

Figure 7:
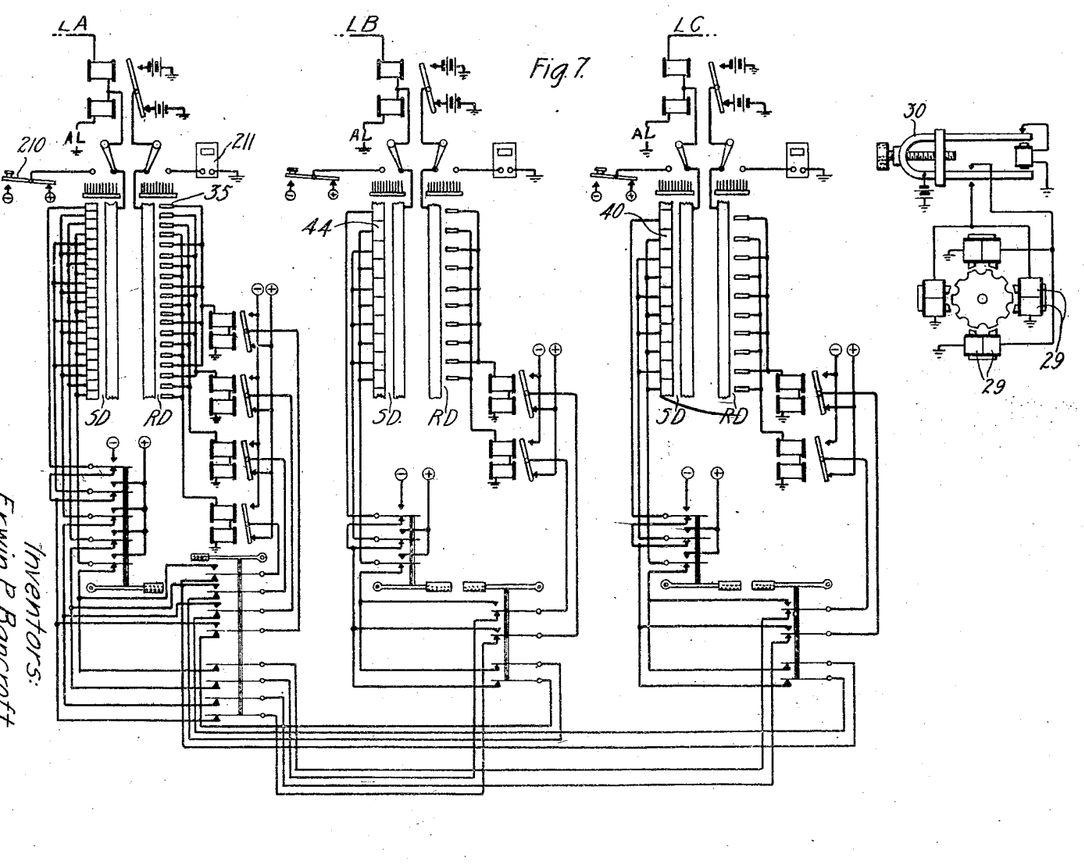
Fig. 7 illustrates diagrammatically the apparatus and circuits required at a repeating station with one line arranged for quadruple duplex operation and each of two other lines arranged for double duplex operation, as illustrated in Fig. 3.

In Fig. 7 is shown repeating apparatus and circuits for a system such as represented diagrammatically in Fig. 3, and wherein one quadruple duplex circuit is forked at the repeating station into two double duplex circuits. In this arrangement, the sending segments of the double distributor faces are twice the length of the sending segments of the quadruple distributor face. In the arrangement disclosed in Figs. 5 and 6 the complete selections are received and sent out from the quadruple distributors on each of the four quadrants; while in Fig. 7 complete selections are received and sent out from the double distributor faces during each half revolution. In order to obtain the best working results from a system of this kind, it is desirable to employ four polar relays for storing and distributing the signals which come in over the quadruple circuit and are to be sent out over one or the other of the two double circuits. The traffic channels of the quadruple circuit are arranged so that the first channel, which normally corresponds to the first quadrant of the distributor, uses the odd segments of the first ten segments; the second channel, the even segments of the first ten segments; the third channel, the odd segments of the second ten segments; and the fourth channel, the even segments of the second ten segments. In this way the quadruple distributor brush travels the same distance per channel as the brush on the double distributor, and thereby compensates for the difference in length of the distributor segments.

The phasing keys and lag-finding keys, disclosed in Figs. 6 and 7, are for the same purpose and perform the same functions as in the circuits shown in Fig. 5.

In this connection it may be noted that by staggering the adjacent channels of the quadruple circuit on the odd and even segments of the distributor, better margins are obtained if the relative positions of the brushes on the repeater distributor is such that the brushes of the double face distributors are staggered with respect to each other; that is, when the quadruple receiving brush is on segment 35, the double sending brush for line LB should be on the latter part of segment 44, and the double-sending brush for line LC should be on the latter part of segment 40, with a corresponding relation of the receiving brushes of the double and sending brushes of the quadruple distributor face working in the other direction.

The successful operation of the systems disclosed in Figs. 1 to 7 inclusive, requires that the time lags in the separate lines from the repeater station to the several terminal stations are compensated for separately at the sending distributors of each of the respective terminal multiplex stations, in other words, the sending rings are set back (or the brushes forward) at each of the multiplex terminals, so that the outgoing signals arrive at the repeater station at the proper instant from the several multiplex terminals to be retransmitted from the repeater station without overlapping the messages or reducing the operating margins, that is, two or more different messages originating in different channels of different lines may be combined at the repeater station and sent out in their proper consecutive order on the proper lines without interference. This necessitates the use of distributors at the terminal multiplex stations designed so that both the sending and receiving rings (or the brushes) may be orientated independently of each other. No orientation or adjustment of the rings or brushes at the repeater station is necessary since the repeater distributor sets the pace for the system or all of the terminal multiplex stations and the operators at the terminal multiplex stations take care of the phase-finding as well as the lag-finding.

Referring for the moment to Fig. 5, it will be noted that the armatures of the storing relays 19 and 20 and distributor-sending segments are so arranged and connected that half of the signals received over line LA are repeated into line LB and half into line LC, half of the signals received from line LB are repeated into line LA and half into line LC, and finally, half of the signals received from line LC are repeated into line LA and half into line LB. The function of the lag-finding switches 22, 122 and 222 at the repeating station is to effect a rearrangement of the sending segments of the distributors with respect to the storing relays 19 and 20, so that all of the signals received from line LA are repeated back into line LA, all from line LB back into line LB, and all from line LC back into line LC. The lower group of contacts by each lag-finding key is for the purpose of opening the circuits from each of the other lag-finding keys in the event that only one key is thrown to its lag-finding position at one time, thereby preventing signals, coming in on the other lines, from interfering with the lag-finding signals. In this way each multiplex terminal receives from the repeater station the signals sent out to the repeater station by a transmitter at the terminal station. The returned signals may be received, if desired, on a recording printer or any suitable receiving device. Therefore, if each multiplex terminal receives correctly from the repeater station on a recording device the same signals sent out to the repeater station from the transmitter located thereat, the difference between the positions of the sending and receiving rings or brushes at each multiplex terminal is of necessity a correct representation of twice the lag in the line between that terminal station and the repeater station including all the intermediate apparatus plus the lag in the repeater itself; also by phasing or orientating the receiver brushes of each of the terminal multiplex distributors so that they bear the correct relation with respect to the sending segments of the repeater multiplex distributor, it is possible when the lag-finding keys at the repeating station are thrown, for the terminal stations to adjust their sending brushes until they are in the correct phase relation with the receiving segments of the repeater distributor. The different selections from all the terminal stations must arrive at the repeater distributor at exactly the proper instant to be distributed and retransmitted into the desired channels.

The receiving brushes of each of the terminal multiplex distributors are brought into the correct relation by means of the phasing keys 21, 121 and 221 at the repeater station. The phasing keys take care of this by grouping the sending segments of the repeater distributor so that a marking pulse is sent out over each line from one of the segments and spacing impulses sent out from the other nineteen segments. The terminal multiplex receiving brushes are then orientated until the correct character is recorded by the printer R, which corresponds to the position of the particular segment chosen to send out the marking impulses. If lamps are used, as illustrated at L Fig. 8, the receiving brushes of the terminal distributor will be orientated until lamp number 51, or the especially designated lamp, flashes. Then the phasing keys at the repeater station are thrown to normal, as illustrated in the drawings, and the phasing keys 54 at the terminal stations are thrown so that the terminal sending segments are grouped just as the repeater sending segements were before. Now the terminal sending brushes, instead of the receiving brushes, are orientated until the same character as before falls on the same printer, or, if lamps are used, the sending brushes are orientated until lamp 51 flashes. This completes the operations necessary to bring the whole system into synchronism, and all keys are restored to normal. The time lag in each of the lines is compensated for at the terminals by properly setting the sending brushes, and all selections are received at the repeating station at the proper instant, to be retransmitted in the proper channels.

Figure 8:
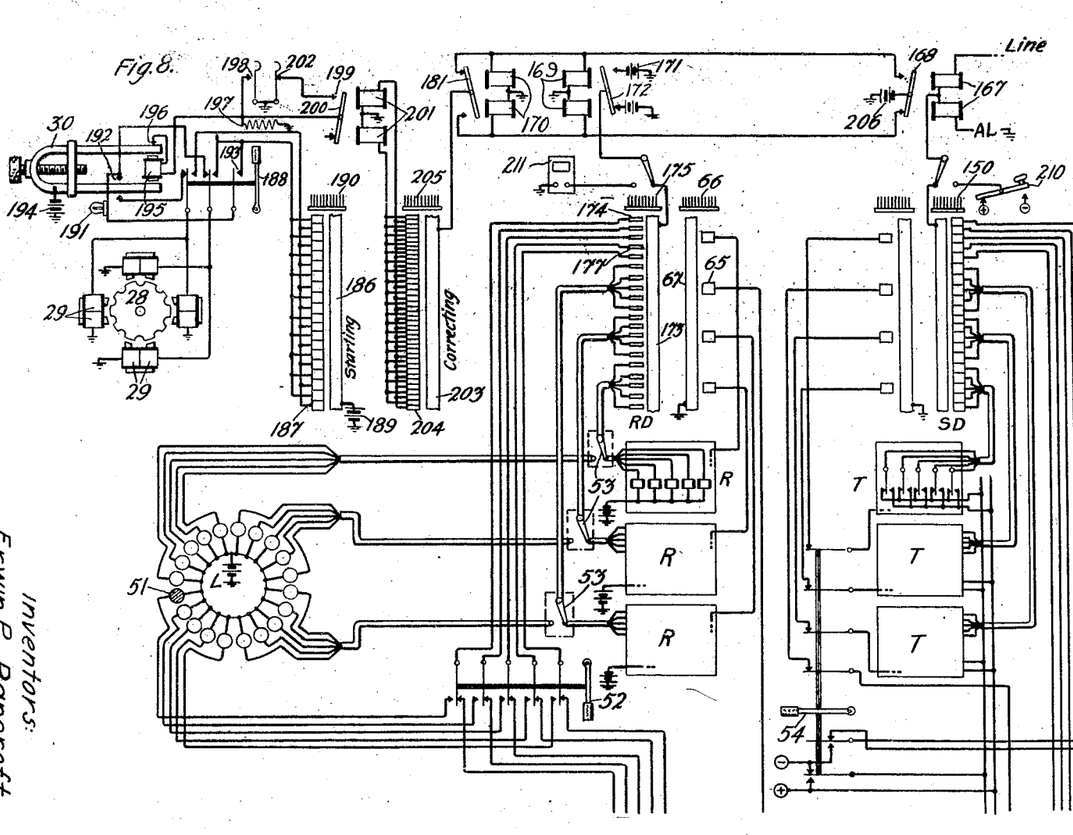
Fig. 8 illustrates diagrammatically one of the multiplex terminal stations with three receiving channels terminating and three transmitting channels originating at the multiplex terminal station, with one transmitting and one receiving channel extended by means of start-stop equipment, as represented to the right of Fig. 9, to a distant or outlying station by means of start-stop equipment, as illustrated to the left of Fig. 9.
Figure 9:
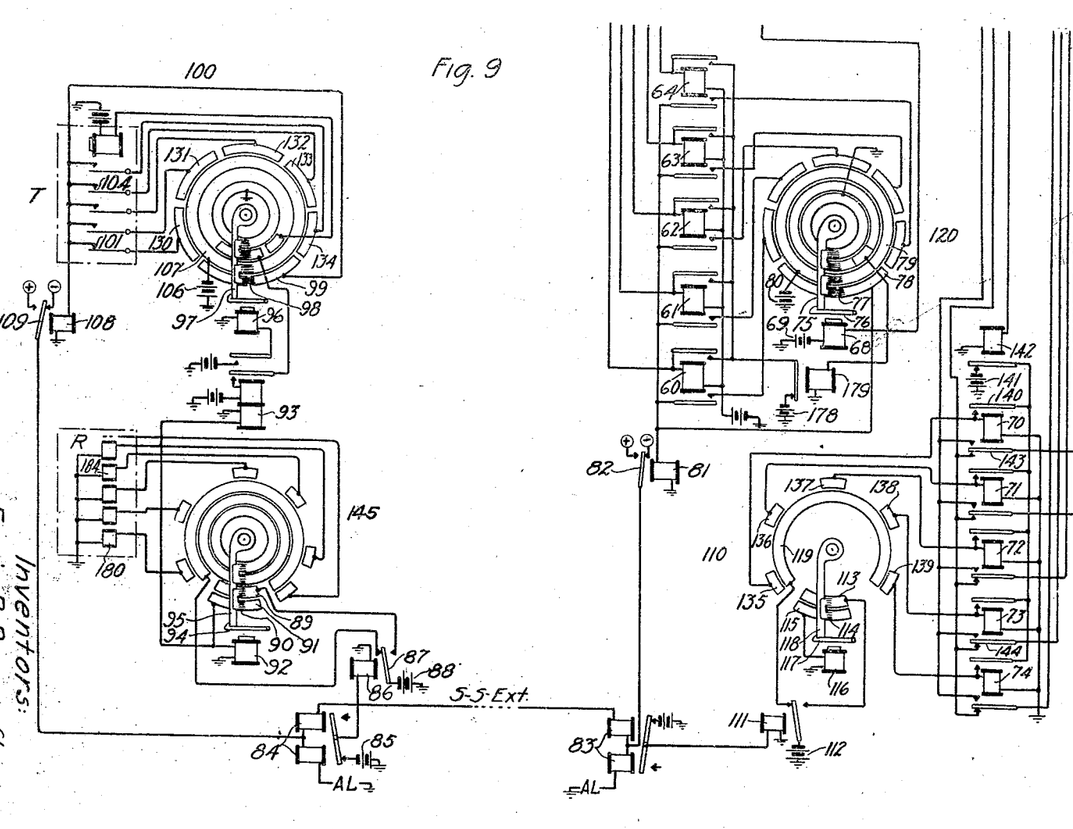

In Fig. 8 there is shown apparatus and circuits required at a terminal multiplex station, with one arm arranged to be extended to a distant or outlying station, by means of start-stop equipment, as illustrated in Fig. 9. In Fig. 8 there is illustrated a group or bank of lamps L, including an especially designated lamp 51. These lamps are adapted to be connected by means of keys or switches 52 and 53, to the segments of the receiving distributor RD for synchronizing purposes. This feature of the system is disclosed and claimed in Patent No. 1,388,507, issued August 23, 1921. The keys 53 are arranged to connect the distributor segments of the second, third and fourth quadrants in circuit with either the lamps L or magnets of receiving printers R. The key 52 is arranged to connect the receiving segments of the first quadrant or channel to a corresponding number of lamps or to a group of five storing relays 60, 61, 62, 63 and 64 (Fig. 9) which are arranged to store signals for retransmission to a distant station. The sending segments of the second, third and fourth quardants of the terminal multiplex distributor SD are connected to three local transmitters, and one group of segments or one channel is connected to the armatures of five storing relays 70, 71, 72, 73 and 74, for transmitting over the line to the repeating station, impulses which are received over a start-stop extension circuit from a distant or outlying station.

A better understanding of the system can perhaps be obtained from a description of the operations which take place in the transmission of a massage. Let it be assumed, for example, that a message is to be transmitted from Kansas City to Gary; also let it be assumed that the message is to be transmitted from Kansas City to St. Louis by means of a start-stop system, from St. Louis to a repeating station at Pittsburgh over a multiplex system, thence from Pittsburgh to Chicago over another multiplex system, and thence over a start-stop system from Chicago to Gary, as illustrated in Fig. 4. Referring now particularly to the terminal multiplex equipment and start-stop equipment shown in Figs. 8 and 9 in conjunction with repeating apparatus such, for example, as illustrated in Fig. 5, let it be assumed that the transmitter T and start-stop sending distributor 100, shown in Fig. 9, is located at Kansas City, that the start-stop distributor 110 (Fig. 9) and multiplex sending distributor SD (Fig. 8) are located at St. Louis. Further let it be assumed that the signaling impulses sent out from the multiplex distributor SD (Fig. 8) are received at Pittsburgh over the line LB (Fig. 5) and retransmitted over the line LC to Chicago, which we may assume is represented by the multiplex receiving distributor RD (Fig. 8) where the signaling impulses are automatically transferred from the multiplex distributor RD to a start-stop distributor 120 (Fig. 9) where the impulses are retransmitted over a start-stop extension circuit to Gary, represented by a start-stop receiving distributor 145 and recorder R. At this point it is well to bear in mind that the multiplex distributors are all operating continuously and in synchronism and that the start-stop distributors at the distant stations are controlled by the local contacts or segments on the terminal multiplex distributors. Let it be assumed that the character D which, according to the five unit code, is represented by five units of current, no current, no current, current, no current, is to be transmitted. The start-stop distributor 120 (Fig. 9) is controlled directly from a local segment 65 of the multiplex distributor (Fig. 8). Each time the local distributor brush 66 passes over segment 65 an energizing circuit is completed through release magnet 68 from grounded battery 69, winding of magnet 68, segment 65, brush 66, ring 67, to ground, thereby causing magnet 68 to withdraw pawl 76 from engagement with the start-stop distributor brush arm 75, whereupon the arm 75 makes one complete revolution and is again arrested by the pawl 76. During each revolution of the start-stop distributor arm 75, the brush 77 carried thereby completes a circuit from grounded battery 80, continuous ring 79, brush 77, segment 78, through the winding of pole-changing relay 81 to ground. Relay 81 remains energized while the distributor brush arm 75 is at rest or while it is held by the pawl 76. As soon, however, as the distributor arm 75 is released and the distributor brush 77 passes off of segment 78, the circuit through the pole-changing relay 81 is broken and its armature 82 falls back into engagement with its back contact, thereby connecting spacing current to the start-stop extension circuit. By reason of the duplex arrangement, the polar relays 83 and 84 are responsive only to impulses received over the start-stop extension circuit, hence relay 84 will respond to current controlled by relay armature 82 and, upon receipt of spacing current, causes its armature 85 to open the energizing circuit through release control relay 86. Relay 86, upon being de-energized, permits its armature 87 to fall back into engagement with its back contact and complete circuits from grounded battery 88, armature 87 and back contact thereof, segment 89 of distributor 145, brush 90, segment 91, through release magnet 92 of distributor 130 and release control relay 93 of distributor 100 in parallel. Release magnet 92, when energized, withdraws the pawl 94 and releases brush arm 95 of distributor 145; and relay 93, when energized, completes an energizing circuit through release magnet 96 of the sending start-stop distributor 100. Relay 93, when energized, also completes a temporary holding circuit for itself, which is broken shortly after the distributor brush arm 97 is released. Now assuming that the combination representing the character D has been set up on the transmitter T (Fig. 9), contacts 101 and 104 will be closed and the remaining contacts will be opened. While the distributor brush arm 97 is at rest, a circuit is established through pole-changing relay 108, from grounded battery 106, distributor ring 107, distributor brush 98, segment 99, through the winding of relay 108, to ground. Now, the instant the distributor arm 97 is released, brush 98 passes off of segment 99, the circuit through relay 108 is broken and its armature 109 falls back into engagement with its back contact, thereby connecting spacing current to the start-stop extension circuit and causing line relay 83 to actuate its armature and open the energizing circuit of release control relay 111. Relay 111, upon being de-energized, permits its armature to fall back into engagement with its back contact, thereby completing a circuit from grounded battery 112, armature of relay 111, back contact thereof, segment 113 of distributor 110, brush 114, segment 115, through the winding of release magnet 116, to ground. The completion of this circuit causes magnet 116 to withdraw the pawl 117 from engagement with the distributor brush arm 118. The distributor brush arms 97 and 118 are now released and free to rotate due to frictional engagement between the brush arm and a continuously operating motor, as is well understood in the art. The segments of the distributor faces are so adjusted and the speed of the distributor brush arms so timed that brush 98 of distributor 100 will pass over segments 130, 131, 132, 133 and 134, while the brush 114 passes over segments 135, 136, 137, 138 and 139 respectively of distributor 110. Therefore, when the distributor brush 98 of distributor 100 engages segment 130, a circuit is completed from grounded battery 106, ring 107, brush 98, segment 130, contacts 101 of transmitter T, through the winding of pole-changing relay 108, to ground, thereby placing marking current on the start-stop extension circuit and causing the operation of relay 111 through the operation of line relay 83. The brush 114 of distributor 110 will make engagement with distributor segment 135 the instant relay 111 responds to the first marking impulse of the signaling group, thereby completing a circuit from grounded battery 112, armature of relay 111 and front contact thereof, segment 119, brush 114, segment 135, through the winding of storing relay 70 to ground. Relay 70, upon being energized, attracts its armature 140, thereby establishing a holding circuit for itself from grounded battery 141, armature of relay 142, winding of relay 70 to ground; and through the actuation of its armature 143, a connection is made from marking battery, armature 143 and front contact thereof, to the first segment of the first quadrant of sending distributor SD (Fig. 8), which connection will be extended to the line through the brush 150 and continuous ring of distributor SD. In like manner, when distributor brush 98 of distributor 100 engages segment 133, a circuit will be established through the transmitter contacts 104 and pole-changing relay 108, and a marking impulse will be sent over the start-stop extension circuit to cause the operation of signal-storing relay 73 in the same manner as relay 70, and a connection will be established from marking battery, armature 144 of relay 73, to the fourth segment of the first quadrant of the sending distributor SD. The armature 109 of relay 108 will engage its back contact while the distributor brush 98 passes over segments 131, 132, and 134 of distributor 100. Likewise, the armature of relay 111 will be in engagement with its back contact while the distributor brush 114 passes over segments 136, 137 and 139 of distributor 110, so that storing relays 71, 72 and 74 will not respond to the spacing impulses representing the character D. Now, as the multiplex distributor brush 150 (Fig. 8) passes over the first and fourth segments of the first quadrant of sending distributor SD, marking impulses will be sent to line and received through the line relay 11 (Fig. 5). These impulses will operate relay 11 and cause its armature to move into engagement with grounded battery 151, thereby connecting marking battery to the continuous ring 152 of the receiving distributor RD. The instant the first impulse is connected to ring 152, the distributor brush 153 makes engagement with the first segment of the first quadrant, namely, segment 154, thereby completing a circuit from grounded battery 151, armature of relay 11, ring 152, brush 153, segment 154, through the winding of storing relay 19 to ground. Relay 19, upon being operated, by current from battery 151 completes a circuit from marking battery, through armature 26, contacts 155 of lag-finding key 122, contacts 156 of phasing key 221, sending segment 157 of the sending distributor associated with line circuit LC. The distributor brush 158, in passing over segment 157 connects marking battery through the continuous distributor ring 159, to the apex of the polar relay 12, and over the line circuit LC. Since the second, third and fifth impulses representing the character D are spacing current, the storing polar relays 19 and 20 will be actuated to connect spacing current to the sending segments of distributor 50 associated with line circuit LC when the receiving distributor brush 153 passes over segments 160, 161 and 163 associated with line circuit LB. However, since the fourth impulse is a marking impulse, the brush 153, in passing over receiving distributor segment 162, will cause storing relay 20 to be actuated to connect marking battery to the corresponding segment of sending distributor SD associated with line circuit LC. This circuit will be established from marking battery, armature 27, storing relay 20, contacts 164 of lag-finding key 122, contacts 165 of phasing key 221, segment 166 of distributor SD, brush 158, ring 159 to line circuit LC. Thus it will be seen that the repeating apparatus shown in Fig. 5 serves to receive impulses over any one of a plurality of line circuits, store or rejuvenate the line impulses, and retransmit the signals over another of a plurality of line circuits.

It has been assumed that the impulses sent out from the repeating station (Fig. 5) over the line LC would be received through the line relay 167 (Fig. 8). Relay 167 controls, through its armature 168 and contacts thereof, relays 169 and 170. Relay 169 responds to the actuation of relay 167 and is arranged, upon receipt of marking impulses, to connect battery 171 through armature 172 of relay 169, to the receiving continuous ring 173 of distributor RD. Now, if we assume that relays 167 and 169 will, in response to marking line impulses, connect battery 171 to segments 174 and 177 of distributor RD, as the brush 175 passes over these segments, energizing circuits will be completed through storing relays 60 and 63, associated with start-stop distributor 120, through the contacts of switching key 52. Storing relays 60 and 63 will attract their armatures and establish holding circuits from grounded battery 178, armature of clear-out relay 179, through their armatures and windings, to ground in like manner to storing relays 70 to 74, inclusive. These relays upon being energized, also prepare circuits from ground at pole-changing relay 81, lower armatures of relays 60 and 63 and front contacts thereof, to the corresponding segments of distributor 120. The release of distributor brush arms 75 of distributor 120, and 95 of distributor 145, has been explained, and since the faces of distributors 120 and 145 have been adjusted so that they bear the proper phase-relation with respect to one another, pole-changing relay 81, polar line relay 84 and relay 86 will respond to marking impulses sent out from distributor 120 and in co-operation with distributor 145, will cause the operation of magnets 180 and 184 of the receiving device or printer R. From the circuits just traced it will be seen that message impulses may be transmitted from a start-stop distributor at a distant or outlying station, such as represented by distributor 100 (Fig. 9), over a start-stop extension circuit to a terminal multiplex station, as represented by start-stop distributor 110 (Fig. 9) and multiplex distributor SD (Fig. 8), thence over a multiplex line circuit to a repeating station, such as Fig. 5, where the impulses are received, distributed, stored and retransmitted to another line circuit over which they may be transmitted to a distant multiplex distributor station, such as represented by RD (Fig. 8), thence through a start-stop distributor 120 (Fig. 9), also located at the multiplex terminal station, thence over a start-stop extension circuit to a recording device R associated with the distributor 145 at a distant station.

In the upper left-hand corner of Fig. 8 is shown diagrammatically, synchronizing or speed-correcting apparatus. The synchronous motor or phonic wheel 28, which may be of any well known type, is arranged to be driven by impulses from a starting distributor or from an electromechanical vibrator or driving fork 30. It will be readily understood that when the driving fork 30 is once struck or set in motion, it will continue to vibrate at a constant, uniform speed under the action of operating magnet 195, until the circuit of magnet 195 is permanently opened. The starting distributor, as illustrated, comprises two rings 186 and 187, one of which is continuous and the other segmented. The alternate segments of ring 187 are strapped together and adapted to be connected to the driving magnets 29 and the LaCour motor 28, through contacts controlled by switching key 188. The continuous ring 186 is connected to grounded battery 189 and is adapted to be connected to the segments of ring 187 by a distributor brush 190. The brush 190 always rests on one of the segments of ring 187. When the key 188 is moved to the right, current will flow from grounded battery 189, ring 186, brush 190, one of the segments of ring 187, through contacts of switching key 188 through one pair of diametrically opposed magnets 29 to ground. Thus the motor may be started automatically from an initial state of rest and brought up to the desired speed. Current through either set of magnets will cause the motor 28 to start rotating and will thus move the brush 190 from one segment to another and thereby connect the sets or pairs of magnets 29 alternately in circuit with battery 189. The motor 28 will increase in speed until the desired speed is attained and then the key 188 is moved to the left, as shown in the drawing, thereby placing the motor 28 under control of the electromechanical vibrator 30. The lamp 191 is for the purpose of indicating the speed relations of driving fork 30 and motor 28. When the motor 28, while being driven by current supplied from battery 189, reaches a speed approximating the speed of the driving fork 30, the lamp 191 will appear to be lighted continuously or for a considerable period of time, or else will be extinct for a considerable period of time, depending upon which group of alternate segments 187 the brush 190 is resting upon when the lower prong of driving fork 30 makes engagement with contact 192, that is, if the brush 190 is traveling over the segments connected to key contacts 193 in circuit with lamp 191, each time the prong of fork 30 makes engagement with contact 192, then current will flow from the positive pole of grounded battery 189 to the negative pole of battery 194. If, on the other hand, the brush 190 is passing over segments not connected to key contacts 193 each time the prong of fork 30 engages contact 192, then the circuit through lamp 191 will be open continuously and the lamp will not be lighted. When this condition exists, thereby indicating that the motor 28 is traveling at substantially the same speed as if driven by fork 30, the key 188 is thrown to the left and the magnets 29 are placed under control of the electromechanical vibrator. This method of starting the distributor motor automatically from an initial state of rest, is covered by a copending application, Serial No. 409,132 filed September 9, 1920.

The circuit of operating magnet 195 is normally from grounded battery 194, fork 30, contact 196, winding of operating magnet 195, through resistance 197 to ground. The rate of vibration of the driving fork 30 may be varied by closing key contacts 198, thereby permanently short-circuiting the resistance 197, or the resistance 197 may be short-circuited automatically and intermittently as desired, through contact 199, armature 200 of correcting relay 201 and key contacts 202. The operation of relay 201 is controlled by the line impulses through the correcting distributor, comprising a ring 203, which is continuous, and a ring 204, which is segmented. The segments of the segmented ring are adapted to be connected to the continuous ring 203, by means of a rotating brush 205. Bearing in mind that the speed of the distributors at the terminal multiplex station shown in Fig. 8 is controlled by or corrected from the repeating or pace-setting station, and assuming that the distributor brushes (Fig. 8) travel slightly faster than the distributor brushes at the pace-setting station, then it is necessary to slow-down or dampen the speed of the terminal distributors automatically and at rapidly recurring intervals. This is accomplished by varying the resistance in circuit of the operating magnet 195, through the instrumentality of relays 170, 201 and the correcting distributor. It will be noted that relay 170 is operated from grounded battery 206, controlled by the armature 168 of line relay 167. Whenever the line relay armature 168 makes engagement with one or the other of its contacts, current will flow from grounded battery 206, armature 168, through one winding of relay 170 to ground, and consequently armature 181 will be moved into engagement with one or the other of its contacts. Now the length of time current flows through either winding of relay 201 will be determined by the position of distributor brush 205, and the interval of time between the making of a contact, by relay armature 168, and the breaking of a contact, by relay armature 181. That is, if we assume that the brush 205 is traveling slightly ahead of the distributor at the pace-setting station and that if when this occurs a reversal of line current is received, then current will flow from grounded battery 206, armature 168, through one winding of relay 170 to ground, and also over another path through the corresponding contact of relay 170, armature 181 correcting ring 203, brush 205, segment 204, and through a winding of relay 201 to ground, thereby operating relay 201 and causing it to move its armature 200 into engagement with contact 199 thereby short-circuiting the resistances 197, and consequently reducing the speed of the driving magnet 192. This method of speed-correcting or synchronizing is more fully described in Patent #1,279,905, issued September 24, 1918.

At each of the terminal multiplex stations and each of the repeating stations there is provided ordinary Morse signaling keys 210 and sounders 211. These instruments are adapted to be connected to the line by means of switches or keys 25 for Morse signaling purposes. In Fig. 10 there is shown a stationary multiplex distributor face 215, a rotatable brush arm 216, and a motor 217 for driving the rotatable member. On the motor shaft 218 is mounted a fly-wheel 219 of a well known type. The distributor brush arm 216 is driven by means of bevelled gears 219 and 220 cooperating with a bevelled gear 224 keyed to the motor shaft 218. The gear 220 is carried by a normally fixed or stationary member 225. The member 225 is provided with a handle or extension 226 whereby the distributor brush arm 216 may be advanced or retarded any amount desired while the distributor brush arm 216 is being driven by the motor 217. This feature is very desirable for bringing the distributors into synchronism or into the desired phase relation and is disclosed more fully and claimed in a copending application, Serial No. 420,908 filed November 1, 1920.

While the preferred embodiments of this invention are disclosed in the accompanying drawings, it will be readily understood that various and numerous changes may be made in the circuits and arrangements of the apparatus without departing from the spirit of the invention. While only a limited number of possible combinations have been illustrated, it is contemplated that various and many other combinations may be used, in fact it is contemplated that in addition to the Y-forking arrangement as illustrated in Figs. 1, 3 and 4, New York, for example, instead of acting as a terminal station, may be equipped with repeating apparatus similar to the Pittsburgh station, with certain of the arms from the New York repeating station extended to a terminal station, for example Washington, with other arms extended to another terminal station, for example Boston. With such an arrangement, several channels of communication may be provided between Washington and St. Louis, and Chicago, by way of the repeating stations at New York and Pittsburgh, while other channels may be provided between Boston and St. Louis and Chicago by way of repeating stations at New York and Pittsburgh.

Another combination contemplated is the employment of a system somewhat similar to those represented in Figs. 1 and 2 except that a triple duplex arrangement may be provided between New York and Pittsburgh, with two of the arms extended to St. Louis and one to Chicago, and in addition thereto one arm extending from St. Louis to Chicago by way of Pittsburgh with another arm connecting Chicago and Pittsburgh. Thus it will be seen that by reason of the improved methods of synchronizing, phase-finding and lag-finding, the system is rendered extremely flexible and may be readily adapted to meet various traffic conditions. It should also be noted that by reason of the special synchronizing arrangement, if any line, extending from a terminal station to a repeating station, should be broken or rendered unfit for telegraphic purposes, only those messages will be interrupted which are being transmitted over that particular line and the remainder of the system will not be unbalanced or affected.

What is claimed is:

1. The method of synchronizing two rotatable members operatively interconnected by a transmission line and operated by independent sources of motion, which consists in sending a predetermined signal from one station over the transmission line to another station, causing said last-mentioned station to repeat said predetermined signal back to the originating station to operate a mechanism thereat for indicating the line lag.

2. The method of synchronizing two rotatable members operatively interconnected by a transmission line and operated by independent sources of motion, which consists in sending a predetermined signal from one station over the transmission line to another station causing said last-mentioned station to repeat said predetermined signal back to the originating station to operate an indicating mechanism and then adjusting the sending apparatus to compensate for the line lag as indicated by said mechanism.

3. In a telegraph system, a plurality of terminal multiplex stations, a repeating station, continuously operating distributors at each of said stations, means for sending a predetermined signal from one of said terminal stations to said repeating station, means at said repeating station for causing said predetermined signal to be returned to said terminal station, mechanism at said terminal station for indicating the line lag, and means thereat for compensating for said line lag.

4. In a telegraph system, a plurality of terminal multiplex stations, a repeating station continuously operating and sending distributors at each of the stations, a signaling conductor extending between the terminal stations and the repeating stations equipped with means for providing a plurality of signaling channels between the several stations through the repeating station, and means at the repeating station whereby some of the signaling channels are terminated at the repeating station.

5. In a telegraph system, a plurality of terminal multiplex stations, a repeating station, all of said stations being interconnected by continuously operating synchronous apparatus, means at said repeating station whereby the impulses from each terminal station may be received and stored in signal-storing means comprising storing relays and circuit connections effective so that said relays are invariably operated alternately, and means for retransmitting the stored impulses to other terminal stations.

6. In a telegraph system, a plurality of terminal multiplex stations, a repeating station, all of said stations being interconnected by continuously operating synchronous apparatus, means whereby each of said terminal stations may communicate with predetermined ones of the other terminal stations through said repeating station, a pair of storing relays at the repeating station associated with each line circuit and adapted to be operated alternately by the signaling impulses, a start-stop system extending from one of said terminal multiplex stations to a distant station, and means whereby one of said terminal stations may communicate directly with said distant station through said repeating station.

7. In a telegraph system, a plurality of terminal multiplex stations operatively interconnected with a repeating station, extension circuits extending from each of the terminal stations to branch offices, continuously operated synchronous apparatus at the terminal station, intermittently operable apparatus at the branch offices, current distributors and storing means at the repeating station associated with each terminal line circuit, switching means at the repeating station whereby signaling impulses may be repeated from one line circuit to another, and means at the terminal stations for causing the transmission of corresponding signaling impulses over the extension circuits to the branch offices.

8. In a telegraph system comprising three terminal multiplex stations and a repeating station, all of said stations being interconnected by continuously operating synchronous apparatus, one of said terminal stations being connected to the repeating station by means of quadruple duplex synchronous apparatus, each of the other two stations being connected to the repeating station by means of double duplex synchronous apparatus, and means at the repeating station for receiving, storing and retransmitting the signaling impulses from the quadruple duplex circuit to each of the double duplex circuits simultaneously.

9. In a telegraph system, a plurality of terminal multiplex stations, a repeating station, continuously operated distributing apparatus at each of the substations, means for sending a predetermined combination of signaling impulses from one of said terminal stations to said repeating station, means at said repeating station for causing the retransmission of a corresponding group of impulses back to said terminal station, and mechanism at said terminal station comprising a series of signaling devices for indicating the line lag.

10. In a telegraph system, a plurality of terminal multiplex stations, a repeating station, all of said stations being interconnected by continuously operating synchronous apparatus, means whereby each of said stations may communicate with a predetermined one of the other stations, and a plurality of storing relays at the repeating station associated with each line circuit and circuit connections effective so that said relays are invariably operated alternately for repeating the line signals from one station to another.

11. In a telegraph system, a plurality of terminal multiplex stations, a repeating station, continuously operated distributing apparatus at each of said stations, means for sending a predetermined combination of signaling impulses from one of said terminal stations to said repeating station, means at said repeating station for causing the retransmission of a corresponding group of impulses back to said terminal station, mechanism at said terminal stations comprising a series of signaling devices for indicating the line lag, and means thereat for compensating for such line lag.

In witness whereof, I hereunto subscribe my name this 26th day of June A. D., 1920.

ERWIN P. BANCROFT.
MARK B. KERR.